United States Patent
Hanna

(10) Patent No.: US 9,073,393 B2
(45) Date of Patent: Jul. 7, 2015

(54) METHOD FOR DETECTING A TIRE MODULE DETACHED FROM THE INNER FACE OF A TIRE FOR VEHICLES

(75) Inventor: Joerg Hanna, Roedinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 330 days.

(21) Appl. No.: 13/394,958

(22) PCT Filed: Sep. 27, 2010

(86) PCT No.: PCT/EP2010/064203
§ 371 (c)(1),
(2), (4) Date: Mar. 8, 2012

(87) PCT Pub. No.: WO2011/060986
PCT Pub. Date: May 26, 2011

(65) Prior Publication Data
US 2012/0173073 A1 Jul. 5, 2012

(30) Foreign Application Priority Data
Nov. 18, 2009 (DE) .......................... 10 2009 044 573

(51) Int. Cl.
*G06F 11/30* (2006.01)
*B60C 23/04* (2006.01)

(52) U.S. Cl.
CPC ......... *B60C 23/0493* (2013.01); *B60C 23/0488* (2013.01)

(58) Field of Classification Search
CPC combination set(s) only.
See application file for complete search history.

(56) References Cited

U.S. PATENT DOCUMENTS

| | | | |
|---|---|---|---|
| 5,612,879 A * | 3/1997 | Makino | 701/70 |
| 6,591,671 B2 * | 7/2003 | Brown | 73/146.5 |
| 6,931,920 B2 * | 8/2005 | Modawell et al. | 73/146 |
| 7,254,994 B2 * | 8/2007 | Schulze | 73/146 |
| 7,271,709 B2 * | 9/2007 | Miller et al. | 340/442 |
| 7,308,823 B2 * | 12/2007 | Anders et al. | 73/146 |
| 7,400,231 B2 * | 7/2008 | Haas | 340/426.33 |

(Continued)

FOREIGN PATENT DOCUMENTS

| | | |
|---|---|---|
| DE | 101 37 597 | 2/2003 |
| DE | 102 43 441 | 4/2004 |

(Continued)

OTHER PUBLICATIONS

Partial English translation of Written Opinion conducted in Int'l Appln. No. PCT/EP2010/064203.

*Primary Examiner* — Jonathan L Sample
(74) *Attorney, Agent, or Firm* — Greenblum & Bernstein, P.L.C.

(57) ABSTRACT

The invention relates to a method for monitoring and detecting the detachment of a tire module from the inner face of the tire, having the following steps: measuring the centrifugal acceleration on a tire module by an acceleration sensor arranged in the tire module; forwarding the measured acceleration values to an evaluation unit; analyzing the acceleration values upon acceleration of the vehicle in the starting phase or upon constant low speeds of the vehicle; activating a warning signal in the evaluation unit, insofar as the analysis of the acceleration values results in a statistically significant standard deviation in comparison to a not detached tire module from the inner face of another tire, thus detecting a freely tumbling tire module in the hollow space of the tire; outputting a warning signal indicating which tire module has detached from the inner face of the tire to the vehicle owner.

20 Claims, 1 Drawing Sheet

(56) References Cited

U.S. PATENT DOCUMENTS

| | | | |
|---|---|---|---|
| 2001/0008083 A1* | 7/2001 | Brown | 73/146 |
| 2004/0206167 A1* | 10/2004 | Pacsai et al. | 73/146 |
| 2004/0233050 A1* | 11/2004 | Burghardt | 340/445 |
| 2004/0261510 A1* | 12/2004 | Schulze | 73/146 |
| 2005/0011257 A1* | 1/2005 | Modawell et al. | 73/146 |
| 2005/0150283 A1* | 7/2005 | Shick et al. | 73/146 |
| 2006/0028326 A1* | 2/2006 | Haas | 340/426.33 |
| 2006/0130570 A1* | 6/2006 | Anders et al. | 73/146 |
| 2007/0040660 A1* | 2/2007 | Miller et al. | 340/442 |
| 2007/0088465 A1* | 4/2007 | Heffington | 701/1 |
| 2008/0024286 A1* | 1/2008 | Perras | 340/442 |
| 2008/0243327 A1* | 10/2008 | Bujak et al. | 701/29 |
| 2010/0274441 A1* | 10/2010 | Carresjo | 701/33 |

FOREIGN PATENT DOCUMENTS

| | | |
|---|---|---|
| DE | 10 2005 006904 | 5/2006 |
| DE | 10 2004 064002 | 5/2007 |
| EP | 2 085 254 | 8/2009 |
| WO | 2005/056311 | 6/2005 |

\* cited by examiner

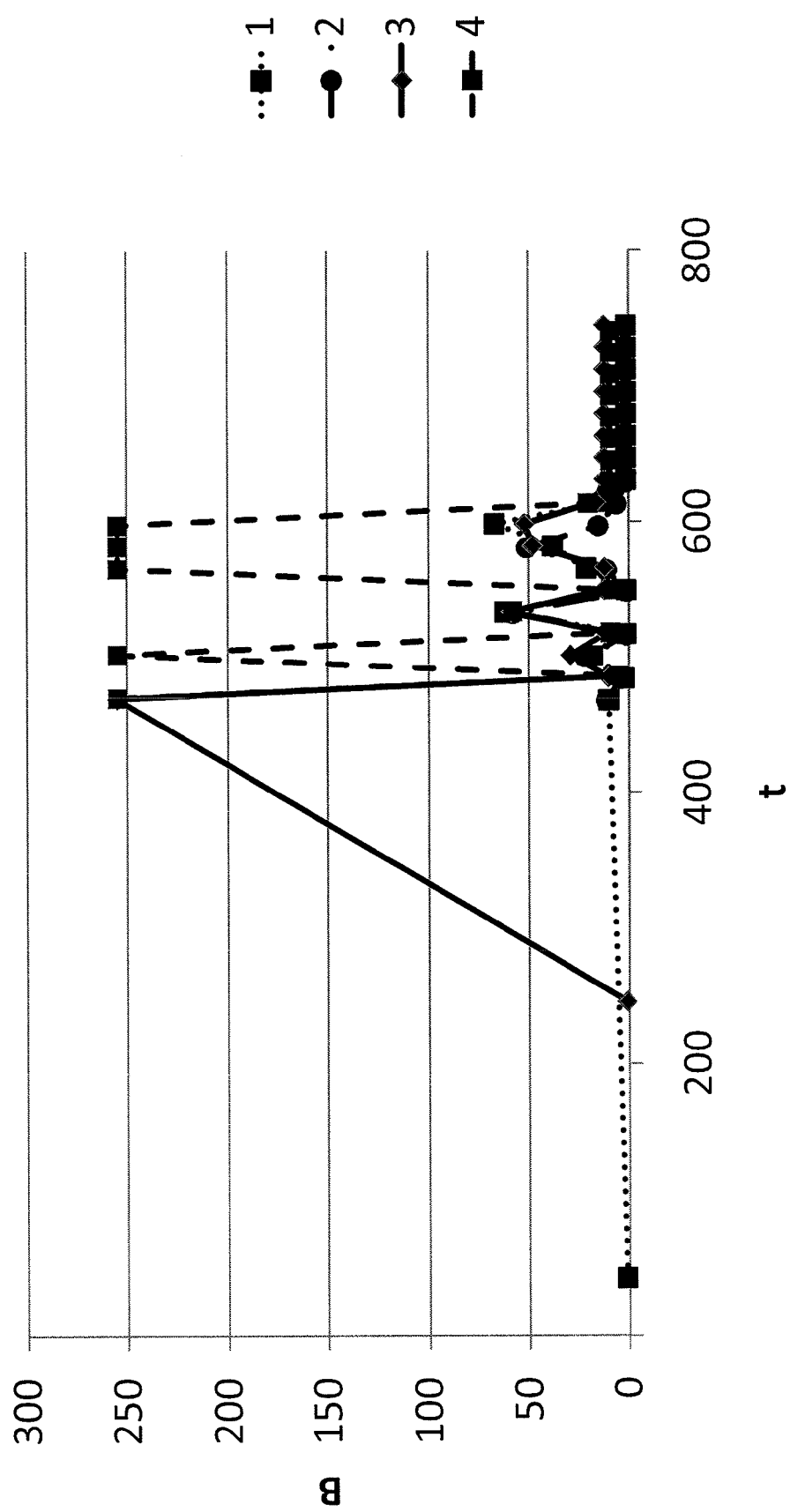

METHOD FOR DETECTING A TIRE MODULE DETACHED FROM THE INNER FACE OF A TIRE FOR VEHICLES

CROSS-REFERENCE TO RELATED APPLICATIONS

The present application a U.S. National Stage of International Patent Application No. PCT/EP2010/064203 filed Sep. 27, 2010, and claims priority under 35 U.S.C. §§119 and 365 of German Patent Application No. 10 2009 044 573.0 filed Nov. 18, 2009.

BACKGROUND OF THE INVENTION

1. Field of the Invention

The invention relates to a method for detecting a tire module, detached from the inner face of a tire, for vehicles.

2. Discussion of Background Information

Tire modules which are provided with transponders are used in tires, in particular in tire sensors for truck tires, for various tasks. These include, in particular tire identification with which an automobile manufacturer can, inter alia, detect in a quick and automated fashion which tire works has supplied a specific tire and on which vehicle the tire was fitted. Other tasks are generally monitoring of the air pressure, measurement of the temperature or the measurement of mechanical stress states in the tire. Modern transponders are composed of an electronic component or electronic chip in which sensor elements can be arranged, and of an antenna which is connected to this electronic component. An example of such a transponder is disclosed by DE 102 43 441 A1.

In systems up to now, the sensors have been screwed to the rim with a clamping belt or attached to the valve seat.

A sensor module which is arranged on the rim can damage the tire on its inner face if it becomes detached from its mount and lies in an uncontrolled fashion in the tire. Sometimes, the electronics of the sensor continue to function for a certain time despite the high accelerations which occur and they also still continue to display a measured value to the driver for this tire. Nevertheless, sharp edges can actually result in damage to the tire without the fault being noticeable from the outside.

The new sensor modules for monitoring tire pressure are bonded into the tire, on the inner face of the tire. As a result, these tire modules are subjected to higher stresses than is the case in the wheel modules which are mounted with a steel belt on the rim or are attached to the valve seat. The risk of the tire modules becoming detached from the inner face of the tire may be greater with this method of attaching sensor modules. It is therefore important to detect a detached tire module as early as possible.

SUMMARY OF THE EMBODIMENTS

The embodiments of the invention are directed to making available a method with which the detachment of a tire module from the inner face of the tire is easily monitored and detected.

Embodiments of the method include:

a) measuring the centrifugal acceleration acting on a tire module, with an acceleration pickup arranged in the tire module, b) passing on the measured acceleration values to an evaluation unit, c) analyzing the acceleration values during the acceleration of the vehicle in the starting phase or at constant low speeds of the vehicle, d) activation of a warning signal in the evaluation unit if the analysis of the acceleration values reveals a statistically significant standard deviation compared to a tire module which is not detached from the inner face of the tire, as a result of which a tire module which is tumbling freely in the cavity of the tire is detected, and e) outputting of a warning signal to the keeper of the vehicle, which indicates to the keeper of the vehicle that the tire module is detached from the inner face of the tire and instructs the keeper of the vehicle to have the vehicle wheels checked by a workshop.

An advantage of the invention is in particular the fact that the method according to the invention reliably and easily detects the detachment of a tire module from the inner face of the tire and subsequently provides the keeper of the vehicle with a corresponding warning message.

The early detection of a detached tire module in the tire can prevent a partial failure of monitoring of the tire pressure because sooner or later the tire module would be unintentionally destroyed and would no longer be able to transmit tire information. Moreover, the risk of a detached tire module irreversibly damaging the tire over the medium term is also reduced. The decisive factor in this method is, in particular, that the analysis of the acceleration values occurs during the acceleration of the vehicle in the starting phase or at constant low speeds of the vehicle. In particular in the starting phase, the acceleration values in the case of a detached tire module can be reliably differentiated from the acceleration values which occur with a tire module which is permanently mounted.

In one advantageous development of the invention, there is provision that during the analysis of the acceleration values of the individual tire modules of the vehicle in the evaluation unit a comparison is carried out between the acceleration values of the individual tire modules. In the case of a statistically significant standard deviation of one of the acceleration values of the tire modules, a tire module which is tumbling freely in the cavity of the tire is detected and a warning signal is subsequently activated. The evaluation of the acceleration values should preferably take place in the control unit of the TPMS [tire pressure monitoring system]. This embodiment has, in particular, the technical advantage that generally more computing power and storage space for carrying out a comprehensive evaluation is available in the control unit. Furthermore, the control unit manages all the tire modules and as a result can compare the acceleration values with one another, with the result that an anomaly in an individual tire module can be detected more quickly and more reliably.

In a further advantageous development of the invention there is provision that the evaluation unit for analyzing the acceleration values is arranged in a central control unit of the vehicle. The control unit receives and evaluates all the signals of the individual tire modules of the vehicle. The tire pressure monitoring system generally includes a central control unit which is arranged in the vehicle and receives and evaluates all the signals of the individual tire modules. The control unit can be simply used for analyzing the acceleration values in accordance with a specific algorithm.

In a further advantageous development of the invention, there is provision that the evaluation unit for analyzing the acceleration values is arranged in the respective tire module, so that each tire module analyzes its own acceleration values and a warning signal is activated in the event of a statistically significant deviation. If the vehicle does not have a central control unit, the evaluation unit can be arranged in the tire module itself. Detection of a detached tire module would then occur by internal evaluation of the acceleration values.

In a further advantageous development of the invention, there is provision that the warning signal is transmitted to a handheld reading device at a maintenance and storage facility when, in the context of a detached tire module, the evaluation unit is arranged in the tire module. In this manner, a warning message is subsequently issued at the handheld reading device. In maintenance and storage facilities for utility vehicles, a corresponding employee would then manually check each vehicle tire with the handheld reading device by holding the handheld reading device against the corresponding vehicle tire. A corresponding fault message which indicates a detached tire module would then be displayed directly on the handheld reading device.

In a further advantageous development of the invention, there is provision that the warning signal is transmitted to a reading antenna which is let into or arranged in or on the floor at the maintenance and storage facility when, in the context of a detached tire module, the evaluation unit is arranged in the tire module. A warning message is subsequently issued. As a result the data can be read in a simple manner on the tire modules.

In a further advantageous development of the invention, there is provision that during the analysis of the acceleration values, the mean values are evaluated by a predefined time window and compared with one another. In this manner, given a significant deviation, a tire module which is detached from the inner face of the tire is detected. The mean values of the acceleration values also constitute suitable measured values with which a detached tire module can be easily detected.

Embodiments of the invention are directed to a method for detecting detachment of a tire module from an inner face of a tire. The method includes measuring a centrifugal acceleration acting on a tire module of a tire, analyzing acceleration values during an acceleration of the tire in at least one of a starting phase and at a constant low speed, activating a warning signal when a statistically significant standard deviation of the analyzed acceleration values is detected relative to acceleration values measured in another tire module, and outputting of a warning signal that the tire module is detached from the inner face of the tire.

According to embodiments, the method can further include measuring the centrifugal acceleration with an acceleration pickup arranged in the tire module.

In accordance with other embodiments of the instant invention, an evaluation unit can be located in the vehicle, and the method may further include forwarding the measured acceleration values to the evaluation unit and analyzing the acceleration values in the evaluation unit. Further, the evaluation unit can detect the statistically significant standard deviation as an indication that the tire module is tumbling freely in the cavity of the tire and activates the warning.

Moreover, an evaluation unit can be located in the tire module, and the method may further include forwarding the measured acceleration values to the evaluation unit and analyzing the acceleration values in the evaluation unit. Further, the evaluation unit can detect the statistically significant standard deviation as an indication that the tire module is tumbling freely in the cavity of the tire and activates the warning. An evaluation unit may be located in the tire module, and the method further comprises forwarding the measured acceleration values to the evaluation unit and analyzing the acceleration values in the evaluation unit.

According to other embodiments, the warning may further instruct a driver of a vehicle with the detected detached tire module to have vehicle serviced.

In accordance with still other embodiments of the invention, each in use tire on the vehicle may include a tire module, and the method can further include analyzing the acceleration values for each of the tire modules, comparing the analyzed acceleration values for each of the tire modules to each other, and activating the warning when a statistically significant standard deviation is detected between the acceleration values of one of the tire module and the acceleration values of the other tire modules.

According to still other embodiments, each in use tire on the vehicle may include a tire module, and the method may further include receiving and evaluating all signals from each individual tire module in a central control unit, wherein the central control unit comprises an evaluating unit to analyze the acceleration values from the individual tire modules.

In accordance with further embodiments of the invention, each in use tire on the vehicle can include a tire module with an evaluation unit, and the method may further include analyzing the acceleration values with the evaluation unit for each respective tire, whereby each tire module analyzes acceleration values and activates the warning signal in response to analysis of its respective tire.

In further embodiments, the method may further include transmitting the warning signal to a handheld reading device at one of a maintenance and storage facility, whereby the warning signal is output to the handheld reading device. Still further, an evaluation unit for analyzing the acceleration values may be arranged in the tire module.

According to still other embodiment of the invention, the warning signal can be transmitted to a reading antenna located in one of maintenance and storage facility, whereby the warning signal is output by a device coupled to the reading antenna. Further, an evaluation unit for analyzing the acceleration values can be arranged in the tire module.

In accordance with other embodiments, the detection of a statistically significant standard deviation of the analyzed acceleration values may include evaluating mean values of the analyzed acceleration values for a predefined time window and comparing the evaluated mean value with an evaluated mean value of the another tire. In this manner, a significant deviation in the compared evaluated mean values can be indicative of detachment of the tire module.

Embodiments of the invention are directed to a method for detecting detachment of a tire module from an inner face of a tire. The method includes analyzing acceleration values on a tire module during an acceleration of the tire, activating a warning signal when a statistically significant standard deviation of the analyzed acceleration values is detected relative to expected measured values of acceleration, and issuing an alert of the detachment in response to the activated warning signal.

According to other embodiments, the acceleration values on the tire module can be analyzed during at least one of a starting phase and at a constant low speed.

In accordance with still yet other embodiments of the present invention, each in use tire may include a tire module, and the acceleration values for each tire module can be analyzed and compared to each other. Further, the acceleration values that are essentially the same can be indicative of the expected measured values of acceleration values.

BRIEF DESCRIPTION OF THE DRAWINGS

The invention will be explained below using an exemplary embodiment, in which:

The FIGURE shows a diagram in which measured acceleration values of tire modules are illustrated.

DETAILED DESCRIPTION OF THE EMBODIMENTS

The FIGURE shows a diagram in which measured values of different tire modules are displayed. The acceleration values B are plotted in bytes on the abscissa, such that the value 250 indicates the maximum acceleration value which can be measured with the acceleration pickup in the tire module. The travel time t is plotted in seconds on the ordinate. The measured values are acceleration values which have been measured in the case of tire modules in utility vehicle tires on a traveling truck.

In the case of a permanently mounted tire module, the profile of the centrifugal acceleration values is such that they continuously increase during the acceleration phase of the vehicle. The curve profiles 1 and 2 show a corresponding measured value profile in the case of a tire module which is permanently mounted on the inner face of the tire. The curve profiles 3 and 4 show such greatly fluctuating measured values in which the tire module has detached from the inner face of the tire and is tumbling freely in the tire cavity. Acceleration values of 250 bytes are measured in the starting phase of the vehicle, that is to say in the travel time t up to approximately 600 s, only on the curve profiles 3 and 4. The extremely large fluctuation of the measured values on the curve profiles 3 and 4 make it possible to reliably infer that there is a detached tire module. In the case of constant travel, constant values are measured. In contrast to this, in the case of a tire module which is tumbling loosely in the tire, in particular in the starting phase and at constant low speeds of the vehicle of less than approximately 50 km/h, measured values which fluctuate to a very large degree are measured. The correct attachment of the tire module can be monitored by statistical evaluation of the acceleration values, since the expected measured values are known when there is a fixed seat of the tire module on the inner face of the tire.

A suitable manner for statistical evaluation is, for example, the consideration of the standard deviation of the measured values over a predefined time period.

LIST OF REFERENCE SYMBOLS

1 Profile of the acceleration values of a tire module mounted fixedly on the inner face of the tire.
2 Profile of the acceleration values of a tire module mounted fixedly on the inner face of the tire.
3 Profile of the acceleration values of a detached tire module.
4 Profile of the acceleration values of a detached tire module.

The invention claimed is:

1. A method for detecting detachment of a tire module from an inner face of a tire of a multi-tire vehicle, comprising:
   measuring a centrifugal acceleration acting on a tire module of a tire to obtain acceleration values;
   analyzing the acceleration values during an acceleration of the tire in at least one of a starting phase and at a constant low speed;
   activating a warning signal of the detachment of the tire module from the inner face of the tire when a statistically significant standard deviation of the analyzed acceleration values is detected relative to acceleration values for not detached tire modules mounted to the inner faces of the other tires of the multi-tire vehicle; and
   outputting the warning signal that the tire module is detached from the inner face of the tire.

2. The method according to claim 1, further comprising measuring the centrifugal acceleration with an acceleration pickup arranged in the tire module.

3. The method according to claim 1, wherein an evaluation unit is located in the vehicle, and the method further comprises forwarding the measured acceleration values to the evaluation unit and analyzing the acceleration values in the evaluation unit.

4. The method according to claim 3, wherein the evaluation unit detects the statistically significant standard deviation as an indication that the tire module is tumbling freely in the cavity of the tire and activates the warning.

5. The method according to claim 1, wherein an evaluation unit is located in the tire module, and the method further comprises forwarding the measured acceleration values to the evaluation unit and analyzing the acceleration values in the evaluation unit.

6. The method according to claim 5, wherein the evaluation unit detects the statistically significant standard deviation as an indication that the tire module is tumbling freely in the cavity of the tire and activates the warning.

7. The method according to claim 6, wherein an evaluation unit is located in the tire module, and the method further comprises forwarding the measured acceleration values to the evaluation unit and analyzing the acceleration values in the evaluation unit.

8. The method according to claim 1, wherein the warning further instructs a driver of a vehicle with the detected detached tire module to have vehicle serviced.

9. The method according to claim 1, wherein each in use tire on the vehicle includes a tire module, and the method further comprises:
   analyzing the acceleration values for each of the tire modules;
   comparing the analyzed acceleration values for each of the tire modules to each other; and
   activating the warning when a statistically significant standard deviation is detected between the acceleration values of one of the tire module and the acceleration values of the other tire modules.

10. The method according to claim 1, wherein each in use tire on the vehicle includes a tire module, and the method further comprises:
    receiving and evaluating all signals from each individual tire module in a central control unit, wherein the central control unit comprises an evaluating unit to analyze the acceleration values from the individual tire modules.

11. The method according to claim 1, wherein each in use tire on the vehicle includes a tire module with an evaluation unit, and the method further comprises:
    analyzing the acceleration values with the evaluation unit for each respective tire, whereby each tire module analyzes acceleration values and activates the warning signal in response to analysis of its respective tire.

12. The method according to claim 1, further comprising transmitting the warning signal to a handheld reading device at one of a maintenance and storage facility, whereby the warning signal is output to the handheld reading device.

13. The method according to claim 12, wherein an evaluation unit for analyzing the acceleration values is arranged in the tire module.

14. The method according to claim 1, wherein the warning signal is transmitted to a reading antenna located in one of maintenance and storage facility, whereby the warning signal is output by a device coupled to the reading antenna.

15. The method according to claim 14, wherein an evaluation unit for analyzing the acceleration values is arranged in the tire module.

16. The method according to claim 1, wherein the detection of a statistically significant standard deviation of the analyzed acceleration values comprises evaluating mean values of the analyzed acceleration values for a predefined time window and comparing the evaluated mean value with an evaluated mean value of the another tire, whereby a significant deviation in the compared evaluated mean values is indicative of detachment of the tire module.

17. A method for detecting detachment of a tire module from an inner face of a tire of a multi-tire vehicle, comprising:
analyzing acceleration values on a tire module during an acceleration of the tire;
activating a warning signal of the detachment of the tire module from the inner face of the tire when a statistically significant standard deviation of the analyzed acceleration values is detected relative to measured values of acceleration for not detached tire modules mounted to the inner faces of the other tires of the multi-tire vehicle; and
issuing an alert of the detachment in response to the activated warning signal.

18. The method according to claim 17, wherein the acceleration values on the tire module are analyzed during at least one of a starting phase and at a constant low speed.

19. The method according to claim 17, wherein each in use tire includes a tire module, and the acceleration values for each tire module are analyzed and compared to each other.

20. The method according to claim 19, wherein the acceleration values that are essentially the same are indicative of the expected measured values of acceleration values.

* * * * *